United States Patent
Bohanan et al.

(10) Patent No.: US 8,770,530 B2
(45) Date of Patent: Jul. 8, 2014

(54) ADJUSTABLE ACCESSORY BRACKET ASSEMBLY

(75) Inventors: Jeff Bohanan, Powell, TN (US); Charles Reeves, Knoxville, TN (US)

(73) Assignee: Protomet Corporation, Oak Ridge, TN (US)

( * ) Notice: Subject to any disclaimer, the term of this patent is extended or adjusted under 35 U.S.C. 154(b) by 128 days.

(21) Appl. No.: 13/198,398

(22) Filed: Aug. 4, 2011

(65) Prior Publication Data

US 2012/0032047 A1 Feb. 9, 2012

Related U.S. Application Data

(60) Provisional application No. 61/370,910, filed on Aug. 5, 2010.

(51) Int. Cl.
*A47F 5/00* (2006.01)
(52) U.S. Cl.
USPC ............. 248/288.51; 248/474; 359/872
(58) Field of Classification Search
USPC .......... 248/288.51, 469, 474, 122.1, 123.2, 248/125.2, 162.1, 405, 411, 412, 222.13, 248/222.14, 354.1, 351, 354.3, 354.4, 248/354.7; 359/871, 872, 879, 880, 881, 359/876, 882; 403/84, 91, 96
See application file for complete search history.

(56) References Cited

U.S. PATENT DOCUMENTS

| | | | |
|---|---|---|---|
| 3,376,644 A * | 4/1968 | Clark | 433/31 |
| 3,977,645 A | 8/1976 | Deely | |
| 5,100,093 A | 3/1992 | Rawlinson | |
| 5,259,582 A | 11/1993 | DeLange, III | |
| 5,419,522 A * | 5/1995 | Luecke et al. | 248/288.51 |
| 5,845,885 A * | 12/1998 | Carnevali | 248/181.1 |
| 6,571,786 B2 * | 6/2003 | Summers et al. | 124/35.2 |
| 6,581,892 B2 * | 6/2003 | Carnevali | 248/276.1 |
| 6,886,795 B2 | 5/2005 | Schultz | |
| 7,007,904 B2 | 3/2006 | Schultz | |
| 7,017,509 B2 | 3/2006 | Schultz | |
| 7,028,959 B2 | 4/2006 | Schultz | |
| 7,090,181 B2 * | 8/2006 | Biba et al. | 248/288.31 |
| D546,753 S | 7/2007 | Schultz | |
| 2006/0016381 A1 | 1/2006 | Schultz | |
| 2006/0102668 A1 | 5/2006 | Schultz | |

* cited by examiner

*Primary Examiner* — Alfred J Wujciak
(74) *Attorney, Agent, or Firm* — Pitts & Lake, P.C.

(57) ABSTRACT

The present general inventive concept provides an adjustable accessory bracket assembly having an adjustment mechanism to adjust one or more axes of rotation of a bracket assembly in order to adjustably position accessory devices, such as a bracket for a mirror or other accessory device. The adjustable accessory bracket assembly can include a handle member, a push rod assembly, and a mounting member such that the handle member pivots with respect to the mounting member. In some embodiments, adjustment of a single rotation axis is provided; other embodiments may be configured to simultaneously adjust multiple axes of freedom for multi-position bracket assemblies.

12 Claims, 6 Drawing Sheets

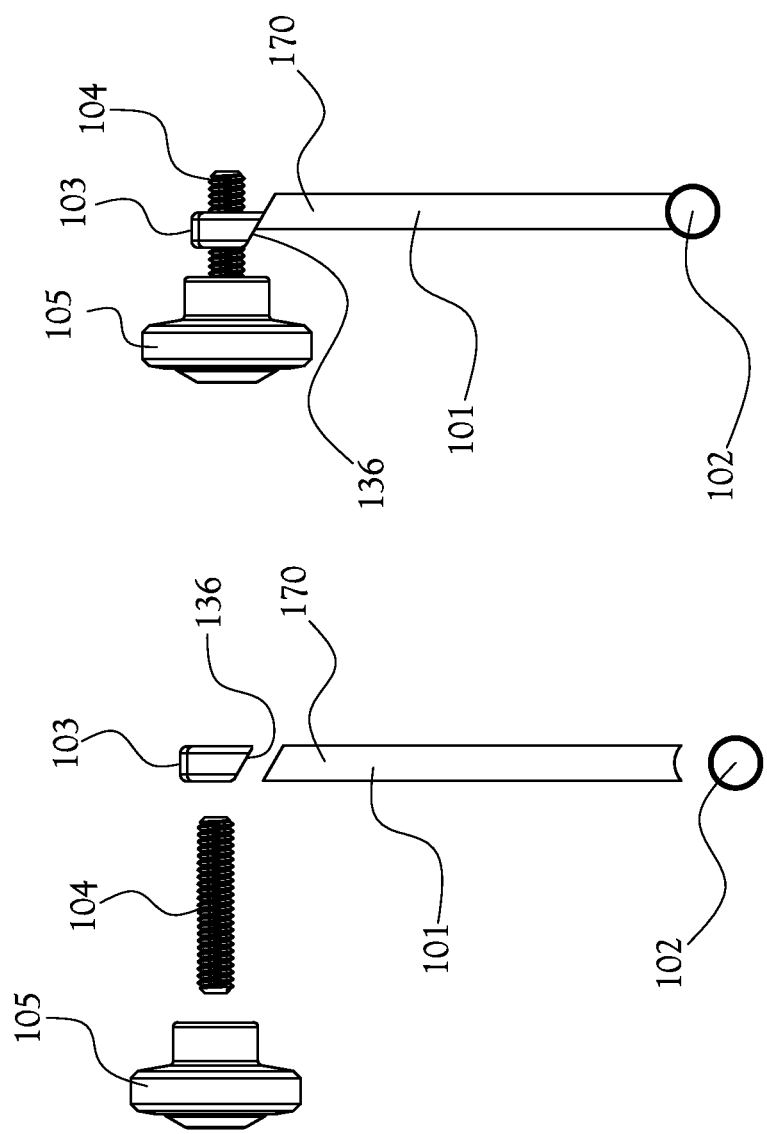

ADJUSTABLE ACCESSORY BRACKET ASSEMBLY

CROSS-REFERENCE TO RELATED APPLICATIONS

This Application claims the benefit of U.S. Provisional Application 61/370,910, filed Aug. 5, 2010.

STATEMENT REGARDING FEDERALLY-SPONSORED RESEARCH OR DEVELOPMENT

Not Applicable.

BACKGROUND OF THE INVENTION

1. Field of Invention

The present invention relates generally to an adjustable accessory bracket, and, more particularly, to an adjustable accessory bracket assembly for an accessory such as a mirror for a boat.

2. Description of the Related Art

The boating industry has commonly used mirrors to provide the operator of a boat with a mechanism for viewing persons being towed behind the boat for various sports, such as water skiing and similar activities. Mirrors on boats may also be useful to improve the operator's peripheral view, as well as awareness of other watercraft or other possible objects in the general vicinity. One of the disadvantages of known devices is that they can be difficult to adjust without having to be completely removed, and can be cumbersome to position, both during and after use. For example, most boats are designed to have a close-fitting cloth or vinyl cover to fit over them, to protect the boat when not in use. Typically, adding a mirror or other accessory device to the boat's profile means the boat cover cannot be placed over the boat until the accessory is removed.

BRIEF SUMMARY OF THE INVENTION

Example embodiments of the present general inventive concept provide an adjustable accessory bracket assembly having an adjustment mechanism to adjust one or more axes of rotation of the bracket assembly in order to adjustably position accessory devices, such as a bracket for a mirror or other accessory device. The adjustable accessory bracket assembly can include a handle member, a push rod slideably insertable into the handle member, a mounting member having an orientation spindle insertable therein such that the handle member pivots with respect to the mounting member about a longitudinal axis of the orientation spindle, and a driving member to drive the push rod towards the orientation spindle such that the push rod provides a force against the orientation spindle to lock the handle member relative to the mounting member. In some embodiments, adjustment of a single rotation axis is provided; other embodiments may be configured to simultaneously adjust multiple axes of freedom for multi-position bracket assemblies. Some embodiments may be utilized to provide adjustment knob location and orientation to adjust and lock single or multiple axes of freedom for various types of bracket devices, including, but not limited to, mirror brackets, light brackets, bimini tops, or any other type of device where adjustable mounting and locking of such devices may be desired. In some embodiments, the driving member is a tapered nut. In some embodiments, the driving member is a cam. In other embodiments, the driving member is a screw. For example, the invention in some embodiments may be applied to various accessory applications such as mirrors, lights, and bimini tops on boats or other vehicles or structures where simplified mounting, adjusting, and locking of such devices may be accomplished. The present invention may also be applied to various applications on a boat or other various marine applications, including, but not limited to, swivel seats, pivoting board racks, flip seats, folding towers, positioning boat accessories, lids, doors, positioning boat fenders, and folding ladders.

BRIEF DESCRIPTION OF THE DRAWINGS

The above-mentioned and additional features of the invention will become more clearly understood from the following detailed description of the invention read together with the drawings in which:

FIGS. 5.A. and 5.B. are diagrams illustrating an exemplary embodiment of a push rod component configured in accordance with an exemplary embodiment of the present invention, where 5.A. illustrates an exploded view and 5.B. illustrates the push rod in "closed" position;

DETAILED DESCRIPTION OF THE INVENTION

The following detailed description may recite various descriptive terms such as horizontal, vertical, top, bottom, upward, downward, left, right, etc., when referring to the exemplary figures, but the present general inventive concept is not limited to any such terms or physical orientations. Such terms are used for convenience of description only, and could be reversed modified, or interchanged without departing from the broader scope and spirit of the present general inventive concept.

Figure 1:
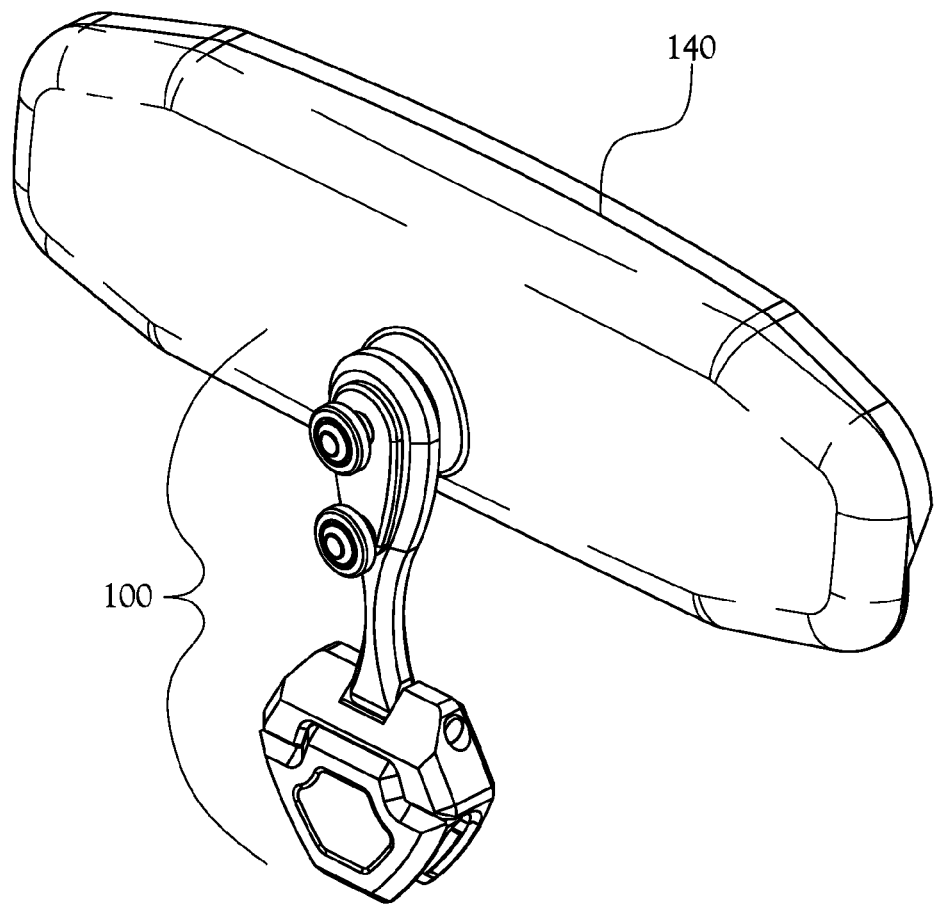
FIG. 1 is a diagram illustrating an example embodiment of the present invention, showing the adjustment bracket with a multi-position adjustment assembly attached to a typical accessory device, specifically, a mirror.

The present general inventive concept, in some of its embodiments such as exemplary embodiment 100 in FIG. 1, may be utilized to adjustably mount and position many various types of accessory devices, such as a mirror 140, as shown in FIG. 1.

Figure 2:
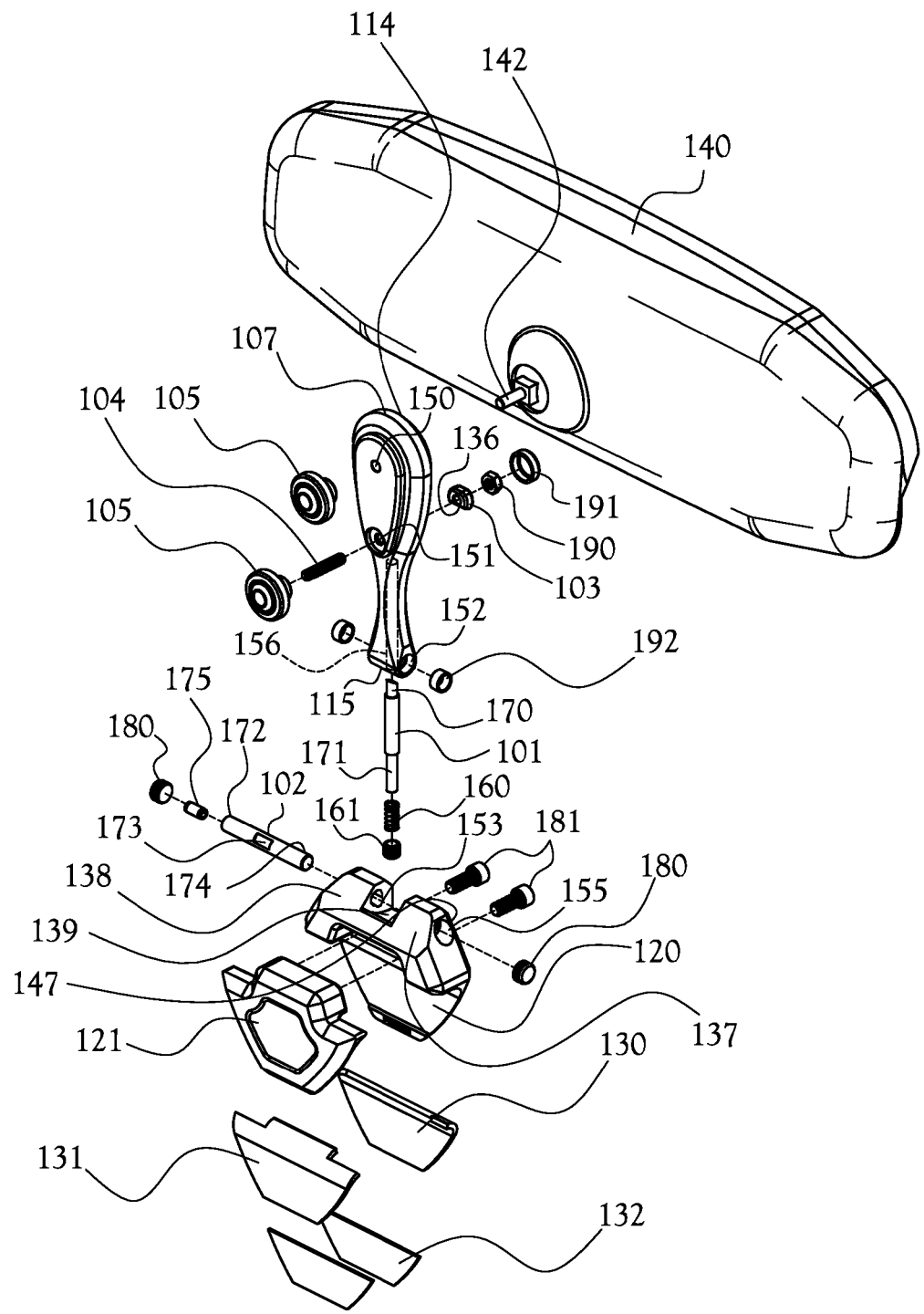
FIG. 2 is a diagram illustrating an exploded view of an example embodiment of the present invention.

FIG. 2 shows an exploded view of FIG. 1 and illustrates an exemplary embodiment of the invention. In this embodiment, an accessory device, such as a mirror 140, may be removeably attached to handle 107 by inserting stem 142 through opening 150 of handle 107, and secured with a knob 105. In some embodiments, opening 150 is located toward upper end 114 of handle 107. The device may then be adjustably mounted and positioned using the adjustment bracket with multi-position adjustment linkage. In some embodiments, handle 107 contains another opening 151, which is connectedly open to a longitudinal cylindrical opening 156 within handle 107. A knob 105 can be fixedly attached to a threaded stem 104. In some embodiments, adhesive (not shown) can be used to fixedly attach knob 105 to threaded stem 104. In some embodiments, knob 105 and handle 107 may be made of aluminum, although the present general inventive concept is not limited to any particular material. Stem 104 is then pushed through opening 151 of handle 107. In some embodiments, stem 104 can be fabricated of stainless steel for strength, although the present general inventive concept is not limited to any particular material. In some embodiments, the driving member can be a cam or a screw. In some embodiments, the driving member can be a tapered nut. Tapered nut 103 can be threaded onto stem 104. Tapered nut 103 rests within opening 151 with tapered edge 136 of tapered nut 103 turned downward. Nut 190 can then be attached to threaded stem 104 to secure tapered nut 103 to threaded stem 104 so as to prevent tapered nut 103 from inadvertently and unexpectedly unthreading completely from threaded stem 104. Optional cap 191 can be placed over nut 190 to provide an aesthetic covering to hole 151. Handle 107 contains longitudinal cylindrical opening 156, which is defined axially within handle 107 at lower end 115 of handle 107, to provide for slideable insertion of a push rod 101 having a first end 170 and a second end 171. Longitudinal cylindrical opening 156 can be connectedly open with opening 151 and also with opening 152. In some embodiments, first end 170 of push rod 101 is tapered. In some embodiments, second end 171 of push rod 101 can be defined to be smaller in diameter than first end 170. In some embodiments, spring 160 can feature a slightly larger interior diameter than the outer diameter of second end 171 of push rod 101 to facilitate spring 160 slidably encompassing second end 171 of push rod 101, whereby to provide a springlike counterforce to any gravitational force upon push rod 101. The exterior dimensions of bushing 161 are defined to be in close tolerance with the interior diameter of longitudinal cylindrical opening 156. Push rod 101 is inserted into longitudinal cylindrical opening 156 such that, in some embodiments, tapered first end 170 of push rod 101 is in surface contact with tapered edge 136 of tapered nut 103. (see FIGS. 5B, 5C, and 5D.) Spring 150 is placed around the outer diameter of second end 171 of push rod 101, such that spring 150 is also within the longitudinal cylindrical opening 156. Bushing 161 is inserted into longitudinal cylindrical opening 156 such that second end 171 of push rod 101, slidably encompassed by spring 150, remains within longitudinal cylindrical opening 156 at lower end 115 of handle 107 and slidably encompassed by bushing 161 at second end 171 of push rod 101.

Handle 107 can also contain opening 152, which intersects longitudinal cylindrical opening 156 near the lower end 115 of handle 107. At least one bushing 192 lines opening 152; in some embodiments, a plurality of bushings 192 is used to line opening 152 on both sides of the point of intersection of longitudinal cylindrical opening 156, to decrease friction during adjustment.

In some embodiments, handle 107, including push rod 101, spring 160, bushing 161, and at least one bushing 192, can be attached to mount 120 in the following manner. Mount 120 has defined within itself, at its upper end 147, two raised hinge blocks, including hinge block 137 and hinge block 138. Hinge block 137 has defined therein opening 155. In some embodiments, opening 155 is basically cylindrical. Hinge block 138 has defined therein opening 153. In some embodiments, opening 153 is basically cylindrical. Orientation spindle 102, being basically cylindrical in shape, is defined to have a plain end 174, a defined end 172, and a flat indexing surface 173. In some embodiments, orientation spindle 102 is made of hardened steel. In some embodiments, flat indexing surface 173 is defined into orientation spindle 102 at approximately the midpoint of orientation spindle 102. Defined end 172 of orientation spindle 102 and opening 153 of hinge block 138 cooperate to define an blind bore along an axial interface of orientation spindle 102 and hinge block 138.

Leading with plain end 174, orientation spindle 102 can be inserted through hinge block 138 via opening 153, through handle 107—containing push rod 101, spring 160, and bushing 161 as previously described—via opening 152, and into hinge block 137 via opening 155. Orientation spindle 102 is typically not inserted into hinge block 137 so far as to exit hinge block 137. In some embodiments, orientation spindle 102 can be inserted into hinge block 137 to the point where plain end 174 of orientation spindle 102 does not protrude outside opening 155. Once thus inserted, in some embodiments, orientation spindle 102 is rotated in order to place flat indexing surface 173 of orientation spindle 102 in surface contact with push rod 101. When the assembly is in an open position, gravitational forces can tend to draw the push rod 101 downward so as to transfer the weight of push rod 101 onto the orientation spindle 102. In some embodiments, the gravitational transfer can occur on flat indexing surface 173 of orientation spindle 102. Spring 160, slideably encompassing second end 171 of push rod 101, offsets gravitational forces upon push rod 101. The offset of gravitational forces allows handle 107 to pivotally rotate about the longitudinal axis of orientation spindle 102 to accommodate multiple position choices for handle 107.

Upon inserting and aligning orientation spindle 102 as described above, a spring pin 175 can be pressed into the blind bore at the interface of orientation spindle 102 and opening 153, to inhibit rotation of orientation spindle 102, thus providing surface contact between flat indexing surface 173 of orientation spindle 102 and push rod 101.

Optional at least one end cap 180 may be placed over opening 153 and opening 155 to help secure orientation spindle 102 and spring pin 175 in place. Such optional use of end cap 180 also adds aesthetically to the assembly.

The mounting member may be formed as a single unit or may be formed of separate units to support the handle member. For example, in the illustrated embodiments, the mounting member includes mount 120 and clamp 121, which can be adjustably attached to one another by at least one keyed pin 181, such as a hex pin. In some embodiments, a plurality of two keyed pins 181 can be employed to stabilize the adjustable attachment between mount 120 and clamp 121 and, further, to mount the bracket to a mountable surface, such as, for example, a boat windshield, a boat windshield frame, or a boat railing. These are but a few examples of mountable surfaces which may be suitable for use with the present invention in its various embodiments. Mount 120 and clamp 121 can be placed on opposite sides of a mountable surface and then the at least one keyed pin 181 is rotated in order to tighten clamp 121 to mount 120 until the assembly can be releasably affixed to the mountable surface by means of compression tension and surface tension. (see FIG. 6). To release mount 120 and clamp 121 from a mountable surface, the at least one keyed pin 181 can be rotated in an opposite direction, thus releasing the compression tension and surface tension, thereby loosening clamp 121 from mount 120 and allowing removal from the mountable surface.

Mount 120 may be lined with a protective material 130, which, in some embodiments, may be a flexible and/or formable substance, such as rubber. Similarly, clamp 121 may be lined with a protective material 131, which, in some embodiments, may be a flexible and/or formable substance, such as rubber. Protective materials 130 and 131 can be used to provide protection to the mountable surface upon which the adjustable bracket is bracketed. Optionally, additional protective material 132 may be utilized with either or both protective materials 130 and 131, to provide for additional protection or to enhance mount and/or position stability for narrower surfaces or surfaces which are non-uniform in shape.

Figure 3:
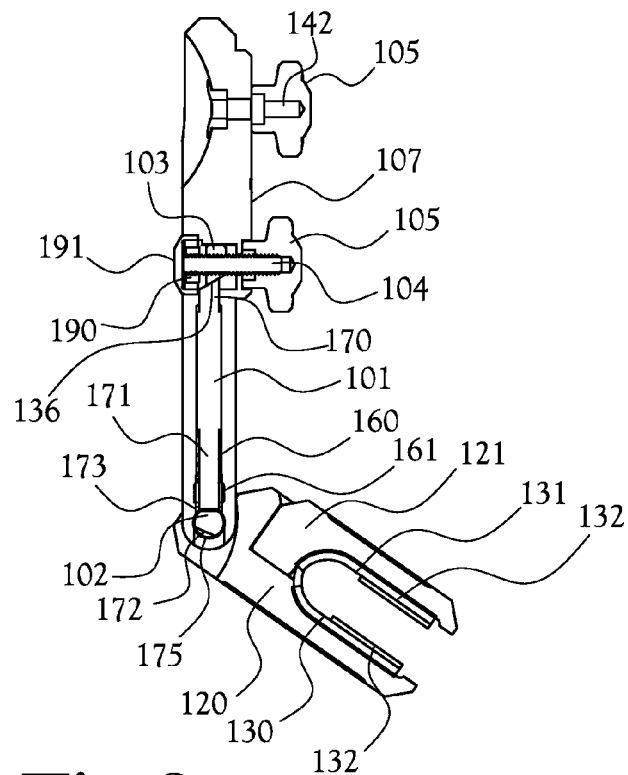
FIG. 3 is a diagram illustrating a cross-sectional view of an example embodiment of the adjustment bracket in an "up" position.

To lock the assembly into an adjustably stationary position, exemplary embodiments can include a knob 105 fixedly attached to threaded stem 104 to rotate threaded stem 104, thus moving the driving member, such as tapered nut 103, along the axis of threaded stem 104 toward handle 107. Tapered edge 136 of tapered nut 103, being in complementary surface contact with tapered first end 170 of push rod 101 (see, e.g., FIG. 3), moves slideably along tapered first end 170, asserting downward pressure on push rod 101 so as to move push rod 101 in a generally downward direction. Second end 171 of push rod 101 is sleeved with spring 160 and bushing 161 to provide a slideable and close tolerance fit between push rod 101 and longitudinal cylindrical opening 156 of handle 107. When push rod 101 moves downward in response to the tightening of tapered nut 103 as described above, push rod 101 transfers the downward pressure to horizontal pressure along orientation spindle 102. This combination of downward pressure on push rod 101 and transferred, horizontal pressure to orientation spindle 102 adjustably locks the bracket 100 in a desired position, thus adjustably securing an accessory device, such as, for one example, a mirror 140.

Figure 4:
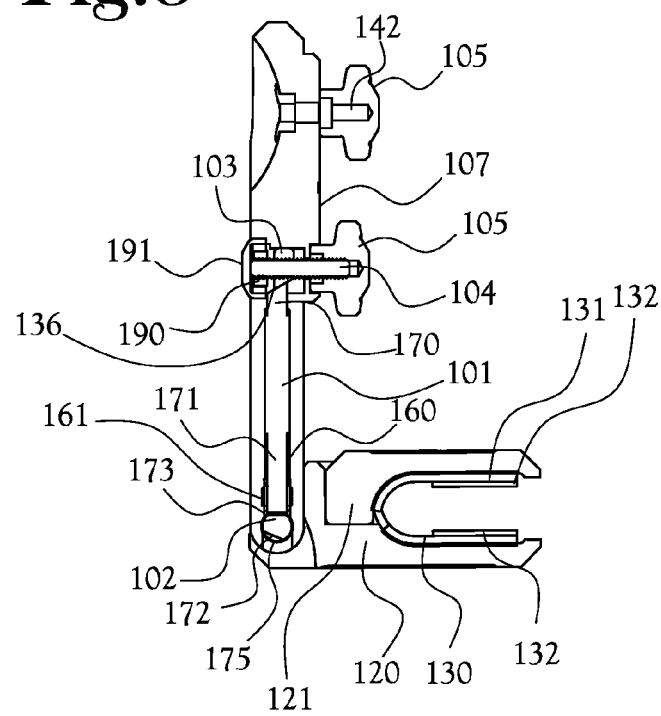
FIG. 4 is a diagram illustrating another cross-sectional view of an example embodiment of the adjustment bracket in a "down" position.

To release, adjust, or reposition the device, in some embodiments, knob 105 can be moved in an opposite direction, thus moving tapered nut 103 along the axis of threaded stem 104 outward away from handle 107. Nut 190 prevents tapered nut 103 from inadvertently and unexpectedly unthreading completely from threaded stem 104. It should be noted that adjustably mounting the mount 120 and clamp 121 to a mountable surface as described above, and adjustably positioning an accessory device via the push rod 101 and orientation spindle 102 assembly as described above, function independently from, yet complementary with, one another. Thus the bracket—with or without an accessory device attached—may, optionally, remain mounted on a mountable surface. Further, while mounted, the bracket may be adjustably locked in a variety of positions, including, but not limited to, an "up" position (see FIG. 3) or a "down" position (see FIG. 4). Additionally, the bracket may be utilized with an integrated mount, such as, but not limited to, a mount integrally formed onto the windshield or railings of a boat.

FIGS. 5.A. through 7 provide a cross-sectional view of various exemplary embodiments of the invention. FIG. 5.A. is an exploded and simplified view, to more clearly illustrate how, in some embodiments, tapered edge 136 of tapered nut 103 is defined to have a complementary angle to tapered first end 170 of push rod 101. As shown in FIG. 5.B., tapered edge 136 of tapered nut 103 is in complementary surface contact with tapered first end 170 of push rod 101. As knob 105 is turned and tapered nut 103 moves along the axis of threaded stem 104 inwardly towards handle 107, tapered edge 136 of tapered nut 103 migrates along tapered first end 170 of push rod 101, applying sufficient pressure to push push rod 101 away from tapered nut 103. If push rod 101 is placed in surface contact with another surface or apparatus, for example, an orientation spindle 102, the push rod 101 transfers pressure onto orientation spindle 102 and maintains the pressure transfer until such time as knob 105 is rotated in an opposite direction, thus migrating tapered edge 136 along tapered first end 170 and allowing push rod 101 to release pressure off orientation spindle 102.

Figure 6A:
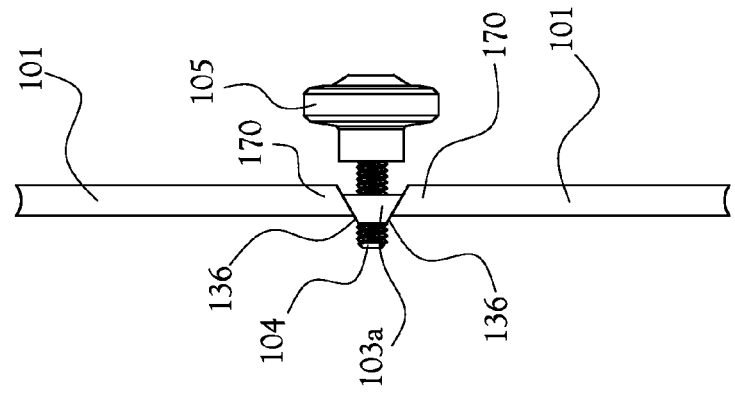
FIGS. 6.A. and 6.B. are diagrams illustrating an example embodiment of the push rod component according to another exemplary embodiment of the present invention, where 6.A. illustrates the push rod in "open" position and 6.B. illustrates the push rod in "closed" position.
Figure 6B:
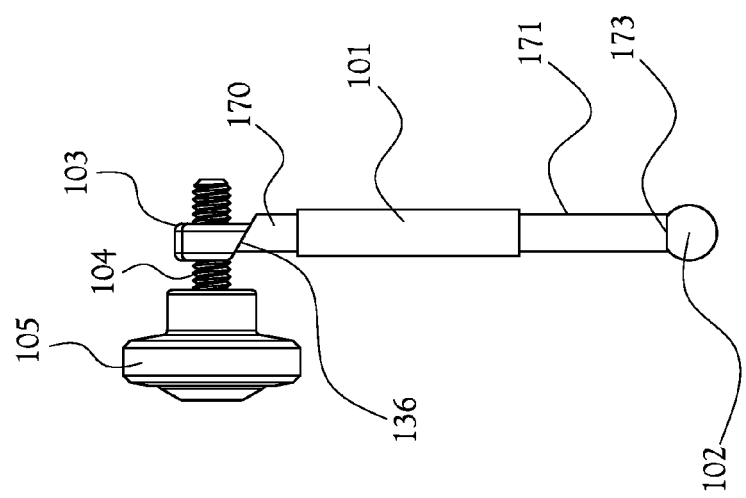

FIGS. 6.A. and 6.B. illustrate another exemplary embodiment of the present invention. As described above, tapered nut 103 and push rod 101 operate to transfer pressure onto an orientation spindle 102. In this embodiment, orientation spindle 102 has defined thereon a flat indexing surface 173. Optionally, second end 171 of push rod 101 may be placed in surface contact with flat indexing surface 173.

Figure 7:
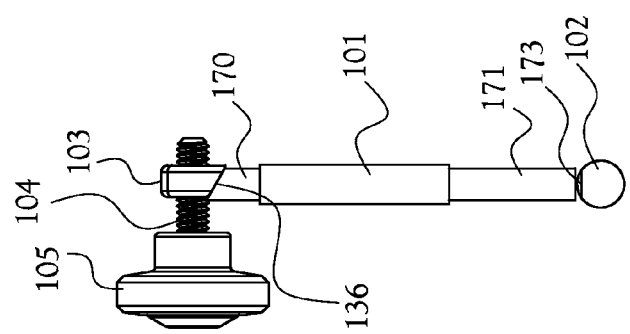
FIG. 7 illustrates another example embodiment of the present invention, featuring a plurality of push rods.

FIG. 7 illustrates another exemplary embodiment of the present invention. In this and similar embodiments, it is possible to utilize a plurality of push rod 101 with a tapered nut 103a having at least one tapered edge 136, the at least one tapered edge 136 in surface contact with a tapered first end 170 of each push rod 101. In some embodiments, tapered nut 103a can be conical in shape. In some embodiments, tapered nut 103a has defined thereon a plurality of tapered edge 136. Knob 105 can be fixedly attached to threaded stem 104. To engage the plurality of push rod 101, knob 105 is rotated, thus tapered nut 103a moves along the axis of threaded stem 104 towards knob 105. The at least one tapered edge 136 of tapered nut 103a migrate along each tapered first end 170 of each push rod 101, forcing each push rod 101 away from tapered nut 103a. Thus engaged, the plurality of push rod 101 facilitate locking multiple axes of freedom, including, but not limited to, vertical and horizontal axes.

Figure 8:
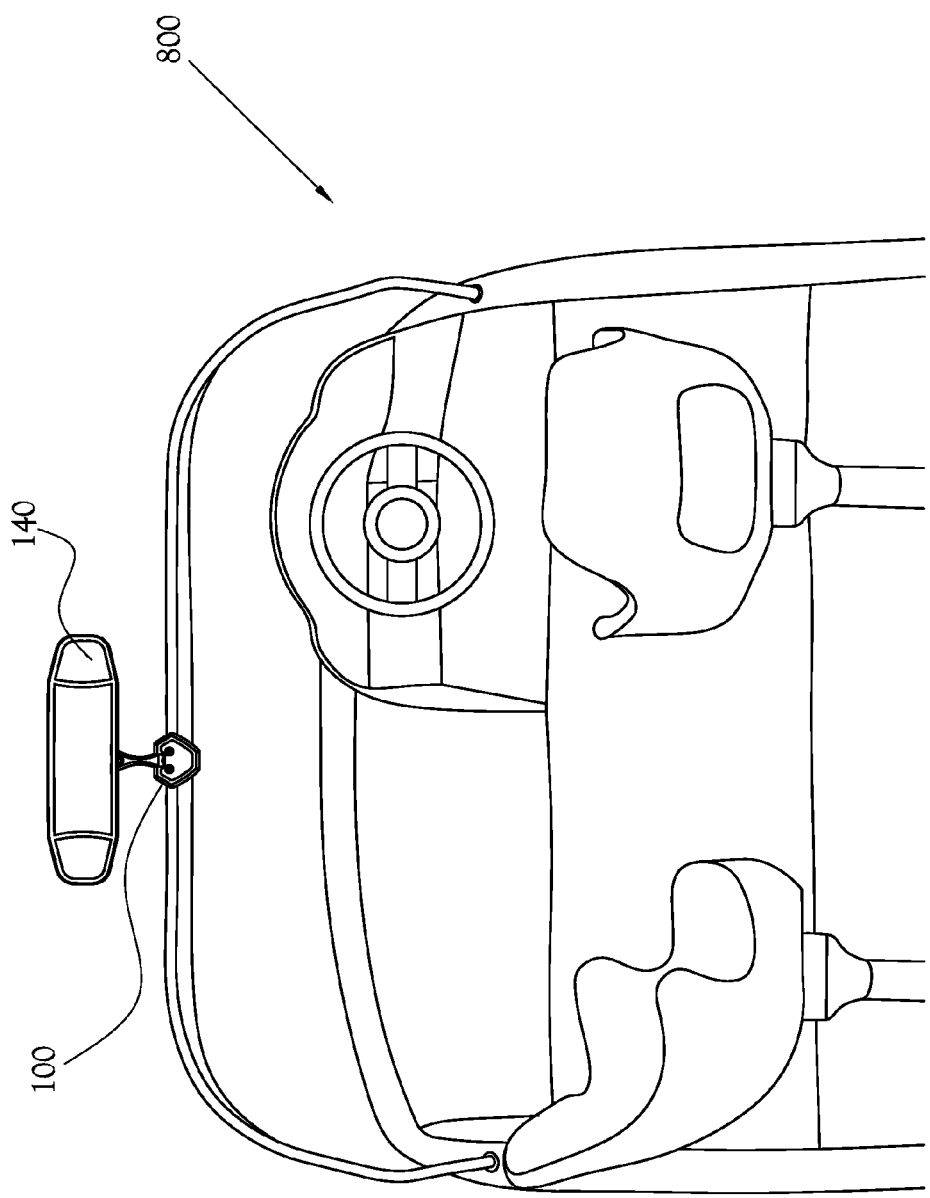
FIG. 8 illustrates another example embodiment of the present invention.

FIG. 8 illustrates an exemplary embodiment of the adjustable accessory bracket assembly 100 in use to adjustably bracket a mirror 140 to a watercraft 800. In some embodiments, the bracket assembly 100 may be mounted to a watercraft 800 via a mounting member, including, but not limited to, mount 120 and clamp 121 as described above. Alternatively, in some embodiments, the bracket assembly 100 may be mounted to a watercraft integrally, with handle 107 adjustably pivoting upward or downward.

While the present invention has been illustrated by description of some embodiments, and while the illustrative embodiments have been described in detail, it is not the intention of the applicant to restrict or in any way limit the scope of the appended claims to such detail. Additional modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

It is also noted that numerous variations, modifications, and additional embodiments are possible, and, accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Accordingly, while the present general inventive concept has been illustrated by description of several embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. An adjustable accessory bracket assembly to support a mirror, comprising:
   a handle member;
   a push rod slideably insertable into said handle member;
   an orientation spindle having a cylindrical shape and at least one complementary flat indexing surface configured to complement an end of the push rod;
   a mounting member to receive the handle member such that said handle member pivots with respect to said mounting member, the mounting member configured to receive the orientation spindle therein; and
   a driving member to drive said push rod along a longitudinal axis of said push rod such that when the push rod is driven in a first axial direction, the end of the push rod and the at least one complementary indexing surface interlock to fixedly maintain the handle member in a chosen position relative to said mounting member, and when the push rod is driven in a second axial direction opposite to the first axial direction, the end of the push rod is axially displaced from the at least one indexing surface to release the interlock and permit the handle member to pivot with respect to the mounting member.

2. The adjustable bracket assembly of claim 1, wherein said driving member comprises a tapered nut.

3. The adjustable bracket assembly of claim 1, wherein said driving member comprises a cam.

4. The adjustable bracket assembly of claim 1, wherein said driving member comprises a screw.

5. An adjustable accessory bracket assembly for use with a boat to support a mirror, comprising:
   a handle member;
   a push rod slideably insertable into said handle member;
   an orientation spindle having a cylindrical shape and at least one complementary flat indexing surface configured to complement an end of the push rod;
   a mounting member to support the handle member, said mounting member configured to receive the orientation spindle therein such that said handle member pivots with respect to said mounting member about said orientation spindle; and
   a driving member to drive said push rod along a longitudinal axis of said push rod such that when the push rod is driven in a first axial direction, the end of the push rod and the at least one complementary indexing surface interlock to fixedly maintain the handle member in a chosen position relative to said mounting member, and when the push rod is driven in a second axial direction opposite to the first axial direction, the end of the push rod is axially displaced from the at least one indexing surface to release the interlock and permit the handle member to pivot with respect to the mounting member.

6. The adjustable bracket assembly of claim 5, wherein said driving member comprises a tapered nut.

7. The adjustable bracket assembly of claim 5, wherein said driving member comprises a cam.

8. The adjustable bracket assembly of claim 5, wherein said driving member comprises a screw.

9. An adjustable accessory bracket assembly to support a mirror, comprising:
   a handle member;
   a push rod slideably insertable into said handle member;
   an orientation spindle having a cylindrical shape and at least one complementary flat indexing surface configured to complement an end of the push rod;
   a mounting member having defined thereon the orientation spindle such that said handle member pivots with respect to said mounting member; and
   a driving member to drive said push rod along a longitudinal axis of said push rod such that when the push rod is driven in a first axial direction, the end of the push rod and the at least one complementary indexing surface interlock to fixedly maintain the handle member in a chosen position relative to said mounting member, and when the push rod is driven in a second axial direction opposite to the first axial direction, the end of the push rod is axially displaced from the at least one indexing surface to release the interlock and permit the handle member to pivot with respect to the mounting member.

10. The adjustable bracket assembly of claim 9, wherein said driving member comprises a tapered nut.

11. The adjustable bracket assembly of claim 9, wherein said driving member comprises a cam.

12. The adjustable bracket assembly of claim 9, wherein said driving member comprises a screw.

* * * * *